(12) United States Patent
Awata

(10) Patent No.: US 7,424,880 B2
(45) Date of Patent: Sep. 16, 2008

(54) INTAKE SYSTEM OF ENGINE

(75) Inventor: Tomoo Awata, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 11/599,181

(22) Filed: Nov. 13, 2006

(65) Prior Publication Data

US 2007/0113817 A1 May 24, 2007

(30) Foreign Application Priority Data

Nov. 14, 2005 (JP) ............... 2005-328602

(51) Int. Cl.
*F02M 35/10* (2006.01)
*F02M 35/02* (2006.01)
(52) U.S. Cl. ............... 123/198 E; 123/184.57
(58) Field of Classification Search ........... 123/184.57, 123/184.61, 198 E, 184.21
See application file for complete search history.

(56) References Cited

U.S. PATENT DOCUMENTS 5,908,017 A * 6/1999 Kaneko ............... 123/195 A
5,950,586 A * 9/1999 Ropertz ............... 123/184.42
6,026,775 A * 2/2000 Yamane ............... 123/184.53
2007/0012276 A1* 1/2007 Ohara ............... 123/184.57

FOREIGN PATENT DOCUMENTS

JP 10141157 A * 5/1998
JP 11125158 A * 5/1999

* cited by examiner

*Primary Examiner*—Stephen K. Cronin
*Assistant Examiner*—Hyder Ali
(74) *Attorney, Agent, or Firm*—Hirsch Simpson LLC (57) ABSTRACT

The present invention provides an intake system of an engine, having the engine mounted on a vehicle, which has a crankshaft oriented in a widthwise direction of the vehicle, and an intake box having an inner space divided by a partition wall into an air cleaner chamber, an intake passage, and a resonator chamber. In such intake system of the engine, the air cleaner chamber is positioned above the intake manifold, the resonator chamber is positioned forward of the air cleaner chamber and the intake passage, and is formed to cover the overall width of the air cleaner chamber and the intake passage, and a through hole is formed between the air cleaner chamber and the resonator chamber, which separates a peripheral partition wall of the air cleaner chamber from a peripheral partition wall of the resonator chamber.

3 Claims, 5 Drawing Sheets

INTAKE SYSTEM OF ENGINE

CROSS-REFERENCE TO RELATED APPLICATIONS

This application claims priority from Japanese Patent Application No. 2005-328602 filed Nov. 14, 2005, the entirety of which is hereby incorporated by reference as if set forth herein in full.

FIELD OF THE INVENTION

This invention relates to an intake system of an engine, and more particularly to an intake system of the engine, which avoids heat damage by the hot wind generated by a radiator and exhaust system to improve output, driving, and noise reduction performance of the engine.

BACKGROUND OF THE INVENTION

There are some vehicles having a crankshaft oriented in a widthwise direction of the vehicle. The vehicles include for example: an exhaust manifold positioned forward of the engine in a longitudinal direction of the vehicle; an intake manifold rearward of the engine; and an intake box that covers a cylinder head cover on top of the engine and the intake manifold. See, e.g., JP Laid-Open No. H10-141157, and JP Laid-Open No. H11-125158.

SUMMARY OF THE INVENTION

Problems to be Solved by the Invention

In conventional intake systems of the engine, there are some vehicles in which the engine is mounted on the vehicle with the crankshaft oriented in the widthwise direction of the vehicle, the exhaust manifold is mounted forward of the engine in a longitudinal direction of the vehicle, the intake manifold is mounted rearward of the engine, and the intake box having internally an intake passage, an air cleaner chamber, and a resonator chamber is mounted above the engine.

Here, hot wind generated by the radiator and the exhaust manifold disposed toward the front side of the vehicle may travel upwardly along the engine and enter below the intake box.

As a result, the outside air taken through an inlet is heated as passing the intake box, which undesirably detriments the output performance of the engine.

In addition, a fuel injection valve and a fuel delivery pipe for supplying the fuel to the injection valve are disposed in a space between the intake manifold and the intake box. The fuel in the fuel injection valve and the delivery pipe is heated by the hot air, resulting in detriment of the startability of the engine.

Further, the intake box is placed above the engine through a floating rubber. Continuous exposure of the rubber to the hot air results in harden rubber and undesirably enhances the vibration of the intake box.

The object of the present invention is to provide an intake system of an engine in which an intake box that contains an intake passage, air cleaner, and a resonator chamber is positioned above the engine, in order to prevent the intake box and surrounding parts from being heated, thereby improving the output, driving, and noise reduction performance of the engine.

Means to Solve the Problems

In order to obviate the above-mentioned inconveniences, the present invention provides an intake system of an engine. The engine is mounted on a vehicle, which has a crankshaft oriented in a widthwise direction of the vehicle. An exhaust manifold is located forward of the engine in a longitudinal direction of the vehicle, an intake manifold is located rearward of the engine. An intake box covers a cylinder head cover that is disposed on top of the engine and the intake manifold. The intake box has an inner space divided by a partition wall into an air cleaner chamber for containing a filter element, an intake passage for introducing the outside air to the air cleaner chamber, and a resonator chamber in communication with the intake passage. In such intake system of the engine, the air cleaner chamber is positioned above the intake manifold, the resonator chamber is positioned forward of the air cleaner chamber and the intake passage, and is formed to cover the overall width of the air cleaner chamber and the intake passage, and a through hole is formed between the air cleaner chamber and the resonator chamber, which separates a peripheral partition wall of the air cleaner chamber from a peripheral partition wall of the resonator chamber.

Effects of the Invention

According to the present invention, the engine is mounted on a vehicle, which has a crankshaft oriented in a widthwise direction of the vehicle. An exhaust manifold is located forward of the engine in a longitudinal direction of the vehicle, an intake manifold is located rearward of the engine. An intake box covers a cylinder head cover that is disposed on top of the engine and the intake manifold. The intake box has an inner space divided by a partition wall into an air cleaner chamber for containing a filter element, an intake passage for introducing the outside air to the air cleaner chamber, and a resonator chamber in communication with the intake passage. In such intake system of the engine, the air cleaner chamber is positioned above the intake manifold, the resonator chamber is positioned forward of the air cleaner chamber and the intake passage, and is formed to cover the overall width of the air cleaner chamber and the intake passage, and a through hole is formed between the air cleaner chamber and the resonator chamber, which separates a peripheral partition wall of the air cleaner chamber from a peripheral partition wall of the resonator chamber. Consequently, the air cleaner chamber is positioned above and away from the radiator and the intake manifold, which are the source of the heat, so that the air cleaner chamber is prevented from being heated by the hot air. In addition, since the resonator chamber with air layer or air space is thus positioned forward of the air cleaner and the intake passage to cover the overall width of the air cleaner chamber and the intake passage, the resonator chamber functions as a thermal insulating material to prevent the intake passage and the air cleaner chamber from being heated. Further, the through hole prevents the heat from transmitting from a peripheral partition wall of the resonator chamber to peripheral partition walls of the intake passage and the air cleaner chamber, so that the intake passage and the air cleaner chamber are not heated. The above-mentioned arrangement prevents the outer air taken into through the intake passage and the air cleaner chamber from being heated and therefore improves the output performance of the engine.

Best Mode for Carrying Out the Invention

According to the present invention, the air cleaner chamber is positioned above and away from the radiator and the intake manifold, which are the source of the heat, so that the air cleaner chamber is prevented from being heated by the hot air.

In addition, since the resonator chamber with air layer or air space is thus positioned forward of the air cleaner and the intake passage to cover the overall width of the air cleaner chamber and the intake passage, the resonator chamber functions as a thermal insulating material to prevent the intake passage and the air cleaner chamber from being heated. Further, the through hole prevents the heat from transmitting from a peripheral partition wall of the resonator chamber to peripheral partition walls of the intake passage and the air cleaner chamber, so that the intake passage and the air cleaner chamber are not heated. The above-mentioned arrangement prevents the outer air taken into through the intake passage and the air cleaner chamber from being heated and therefore improves the output performance of the engine.

DETAILED DESCRIPTION

Figure 3:
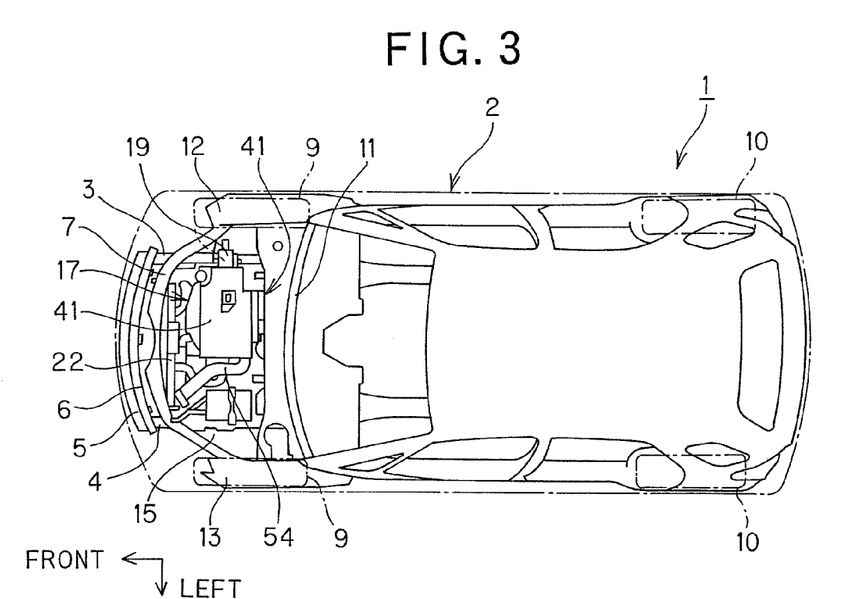
FIG. 3 is a plan view of the vehicle.
Figure 4:
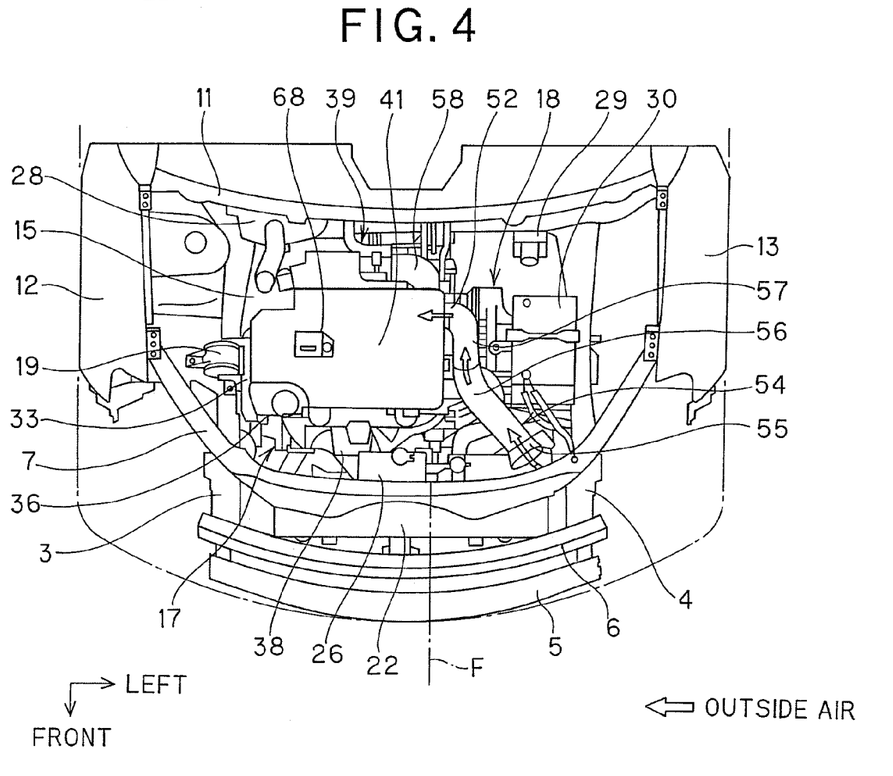
FIG. 4 is a plan view of the engine room.
Figure 5:
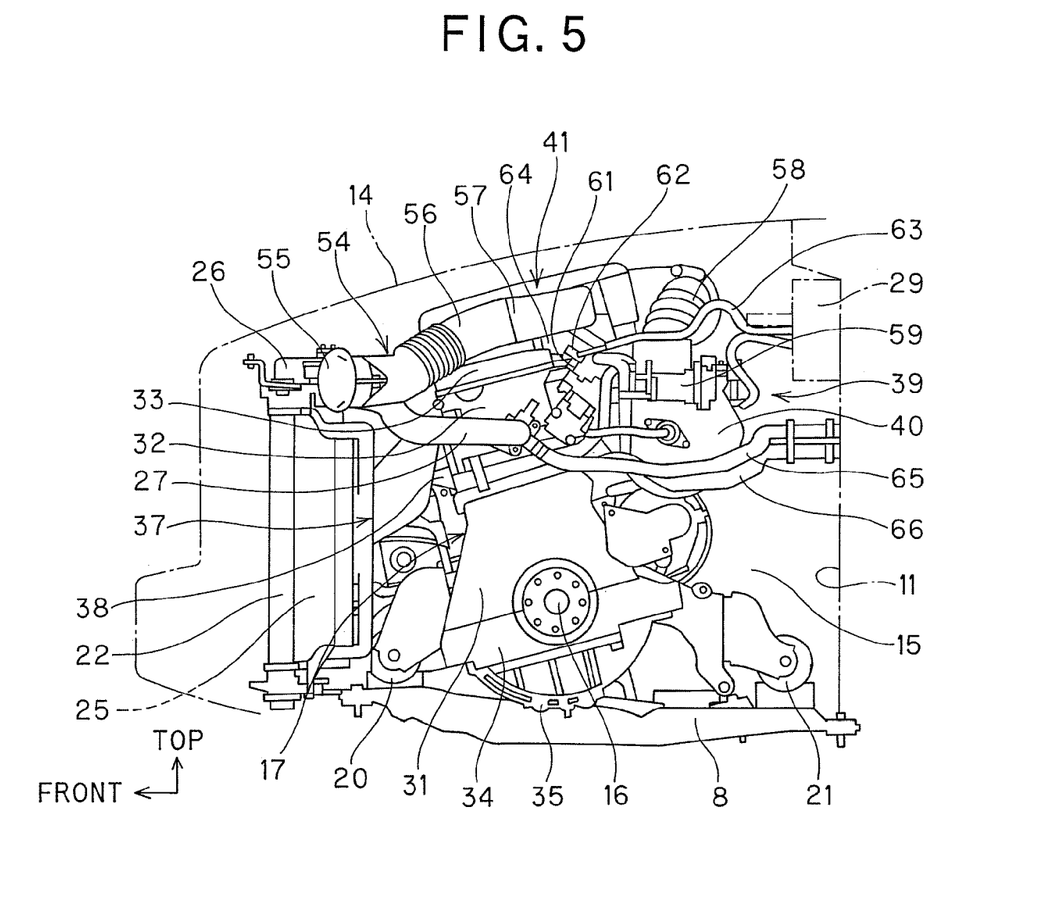
FIG. 5 is a left side view of the engine room.

The present invention is explained in detail with reference to the drawings.
FIGS. 1-7 illustrate an embodiment of the present invention. In FIGS. 3-5, reference numeral 1 designates a vehicle, 2 a vehicle body, 3 a right side frame, 4 a left side frame, 5 a front bumper member, 6 a front lower cross member, 7 a front upper cross member, 8 a front center member, 9 front vehicle wheels, and 10 rear vehicle wheels.

The vehicle 1 includes a dash panel 11 extending sidewardly of the vehicle body 2, and an engine room 15 surrounded by right and left fenders 12, 13 and an engine hood 14 forward of the dash panel 11.

In the engine room 15, an engine 17 and a transmission 18 are arranged side-by-side transversely of the length of the vehicle for mounting on the vehicle 1 with a crankshaft 16 oriented sidewardly of the vehicle.

As shown in FIGS. 3-5, the engine 17 is angled forwardly and supported by a right engine mount 19, a left engine mount (not shown), a front engine mount 20, and a rear engine mount 21 for mounting on a right side of the engine room 15.

The automatic transmission 18 is joined to a joining surface F on a left side of the engine 17 and is mounted on the left side of the engine room 15.

Further, in the engine room 15, a widthwise elongated radiator 22 is attached to the lower and upper front cross members 6, 7 forward of the engine 17 and the transmission 18 through a bracket (not shown).

As shown in FIGS. 4-7, the radiator 22 includes: on the front side thereof, an air conditioner sensor 24 that is elongated widthwise of the vehicle; on the rear side, an electronic fan 25 for radiator; and at an upper center part, a reserve tank 26. The radiator 22 is connected to the engine 17 through a radiator inlet piping 27 and a radiator outlet piping (not shown).

In the engine room 15, a master back 28 for brake and an ABS (Anti-lock brake system) unit 29 are attached to the dash panel 11 rearward of the engine 17 and the transmission 18.

Further, in the engine room 15, a battery 30 is attached to the left side frame 4 on the upper left side of and away from the transmission 18.

As shown in FIG. 5, the engine 17 includes a cylinder head 32 on top of a cylinder block 31 to which a cylinder head cover 33 is attached. To a lower part of the cylinder block 31, a crank case 34 is attached to support the crankshaft 16. An oil pan 35 is attached to a lower part of the crank case 34.

To the cylinder head cover 33, an oil filler cap 36 is attached/detached on a front right side when viewed from the side of the vehicle.

The engine 17 includes a chain cover on right sides of the cylinder block 31 and the cylinder head 32. The transmission 18 is attached to left sides of the cylinder block 31, the crank case 34, and the oil pan 35.

As shown in FIGS. 4-7, the engine 17 includes an exhaust manifold 38 that forms an exhaust system 37 forwardly of the cylinder head 32.

In the exhaust system 37, the exhaust manifold 38 is connected to a catalytic converter that is connected to an exhaust pipe extending rearwardly.

To the engine 17, an intake manifold 40 is attached which forms a part of an intake system 39 rearward of the cylinder head 32.

As shown in FIGS. 3-7, above the intake manifold 40, an intake box 41 is disposed which covers the cylinder head cover 33 on top of the engine 17 and the intake manifold 40.

As shown in FIGS. 1, 2, 6, and 7, an air inlet pipe 52 for introducing the outside air is positioned on a front left side of the intake box 41. An air outlet pipe 53 is positioned on a rear left side of the intake box 41.

On an upstream side of the air inlet pipe 52 orienting toward the left side of the vehicle, an air inlet duct 54 is connected as shown in FIGS. 4 and 5. The air inlet duct 54 includes an inlet hole section 55 at an upstream end, an intermediate hose section 56, and a duct section 57 at a downstream end, which is formed in a cylindrical shape.

In order not to inhale the hot wind that passed the radiator 22, the air inlet duct 54 is disposed in the left end part of the engine room 15 where the intake hole section 55 at the upstream end is positioned forward and above the transmission 18 away from the radiator 22. The intermediate hose section 56 extends rearward of the vehicle 1 above the transmission 18. The duct section 57 at the downstream end is bent toward the engine 17 side for connection to the air inlet pipe 52.

As shown in FIGS. 4-7, the air outlet pipe 53 is connected to an air outlet hose 58. The air outlet hose 58 is formed in a hose shape and is bent below behind the engine 17 for connection to a throttle body 59. The throttle body 59 is connected to a surge tank 60 of the intake manifold 40.

Figure 1:
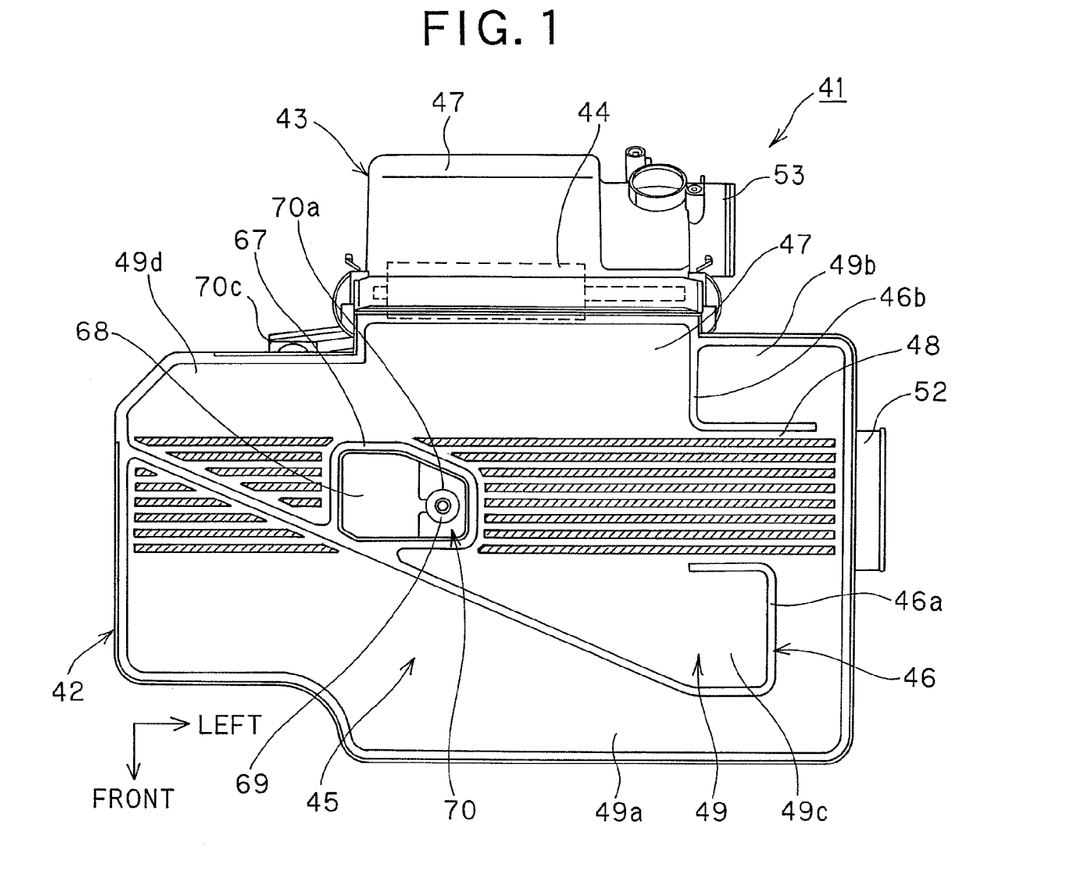
FIG. 1 is a plan view of the intake box according to the embodiment of the present invention.
Figure 2:
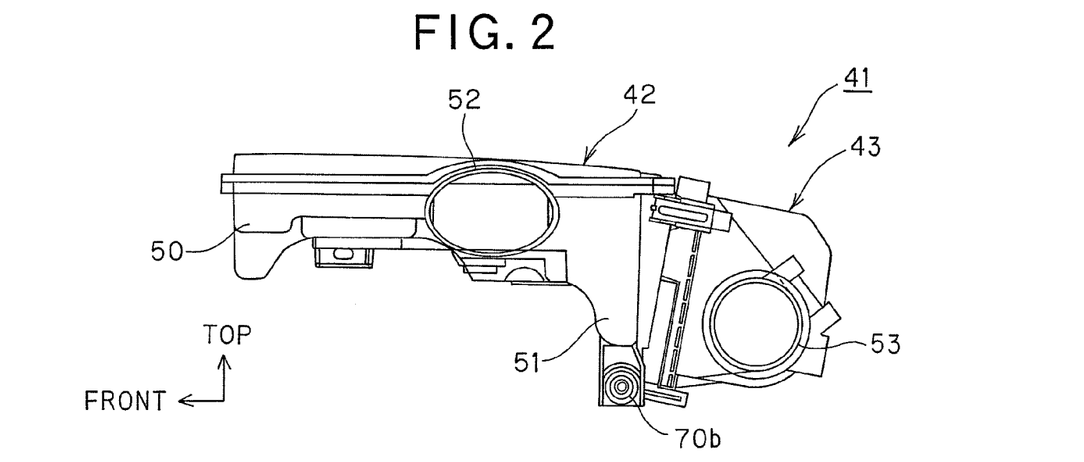
FIG. 2 is a left side view of the intake box.
Figure 6:
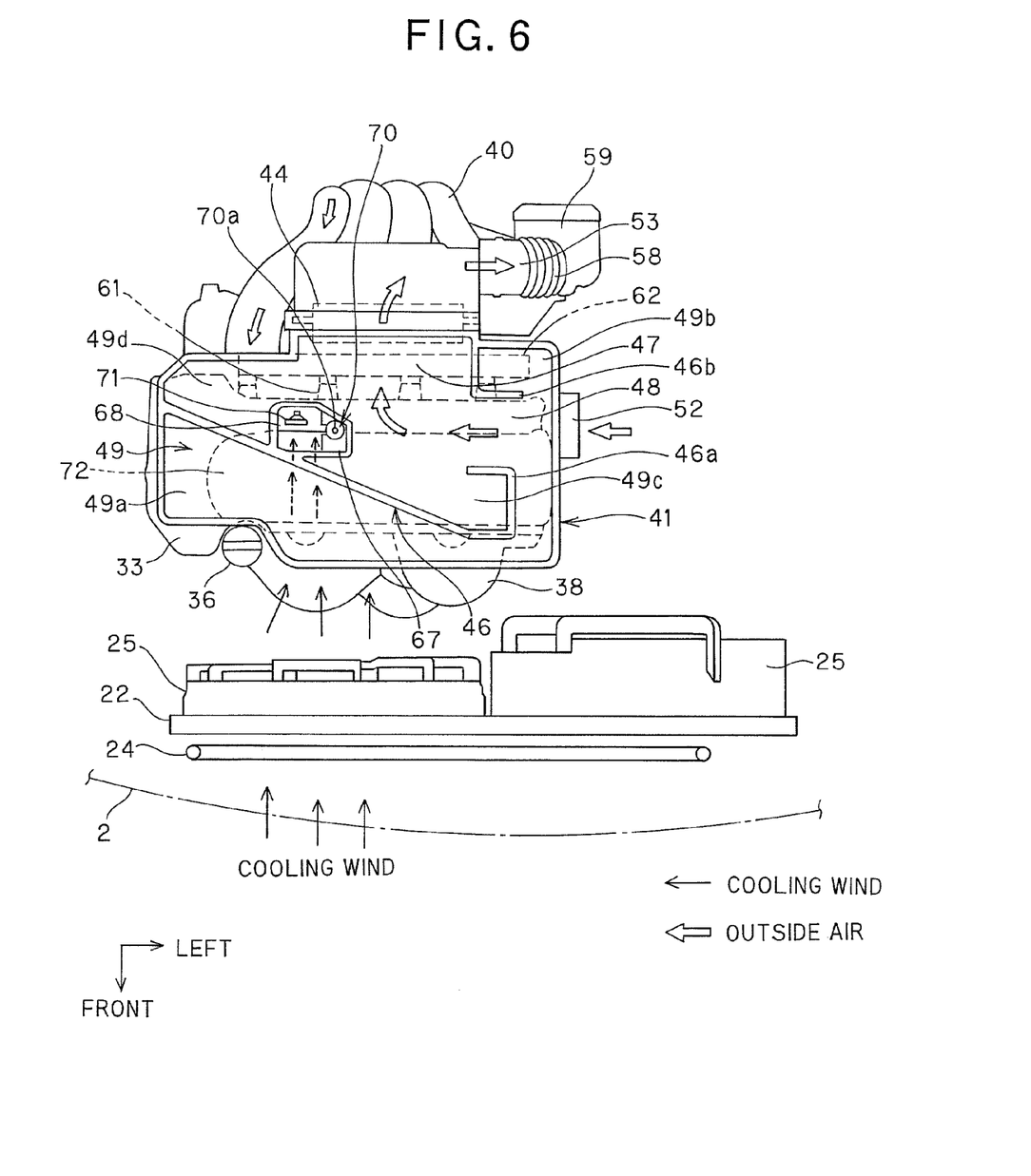
FIG. 6 is a plan view of the engine room with the indication of the flow of the outside air.

As shown in FIGS. 1, 2, and 6, the intake box 41 is formed by an upstream side case 42 provided with the air inlet pipe 52 positioned on a front side of the vehicle and by a lower side case 43 provided with the air outlet pipe 53 positioned on a rear side. A filter element 44 is sandwiched between the upper and lower cases 42, 43.

Inner space 45 within the intake box 41 is separated by a partition wall 46 into an air cleaner chamber 47 for containing the filter element 44, an intake passage 48, and a resonator chamber 49 in connection to the intake passage 48. The intake passage connects between the air inlet pipe 52 and the air cleaner 47 for introducing the outside air to the air cleaner 47.

Then the air cleaner chamber is disposed above the intake manifold 40 at widthwise center of the intake box 41. The intake passage 48 is formed to extend widthwisely from the vicinity of the air inlet pipe 52, and is bent rearwardly of the vehicle at generally center of the intake box 41 so that the downstream section is connected to the air cleaner chamber 47. The resonator chamber 49 is formed by first and second resonator chambers 49a, 49b communicated with an upstream side of the intake passage 48, a third resonator chamber 49c communicated with the intermediate section of the passage 48, and a fourth resonator chamber 49d communicated with the downstream side. The first resonator chamber 49a, the third resonator chamber 49c, and the fourth resonator chamber 49d are located forward of the air cleaner chamber 47, and are formed to cover the overall width of the air cleaner chamber 47 and the intake passage 48.

More particularly, the second resonator chamber 49b is disposed rearward of the intake passage 48. The first resonator chamber 49a is positioned at the forefront section in the intake box 41 and has a rear section covered by a first partition 46a that extends widthwisely of the vehicle. Behind the first partition 46a, the third resonator 49c is positioned toward the left side of the vehicle and the fourth resonator chamber 49d is positioned on the right side. Also, an annular peripheral partition 67 that forms the air cleaner chamber 47 is disposed so as to abut a rear section of the first partition 46a at the boundary of the air cleaner chamber 47, the third resonator chamber 49c, and the fourth resonator chamber 49d. Then a through-hole 68 is formed in the peripheral partition 67 so that the peripheral partition 67 of the air cleaner chamber 47 is separated from the first partition 46a of the resonator chamber 49 between the air cleaner chamber 47 and the resonator chamber 49. The second resonator chamber 49b is formed by an L-shaped second partition 46b extending widthwisely from the vicinities of the air inlet pipe 52 and bending toward the air cleaner chamber 47.

Consequently, when the hot air travels from the radiator 22 and the exhaust manifold 38, the resonator chamber 49 with the air layer or air space functions as a thermal insulating material to prevent the intake passage 48 and the air cleaner chamber 47 from being heated. The through-hole 68 prevents the heat transmission form the partition wall 46 of the resonator chamber 49 to the peripheral partition 67 of the air cleaner chamber 47, which prevents heat increase in the air inhaled the engine 17 through the intake passage 48 and the air cleaner chamber 47 and therefore improves output performance of the engine 17.

Also, when forming the partition wall 46, convex sections are formed which protrude toward the inner of the intake box 41 from respective upper and lower surfaces of the intake box 41, and the tip of the convex sections are abutted each other to form the partition wall 46.

Figure 7:
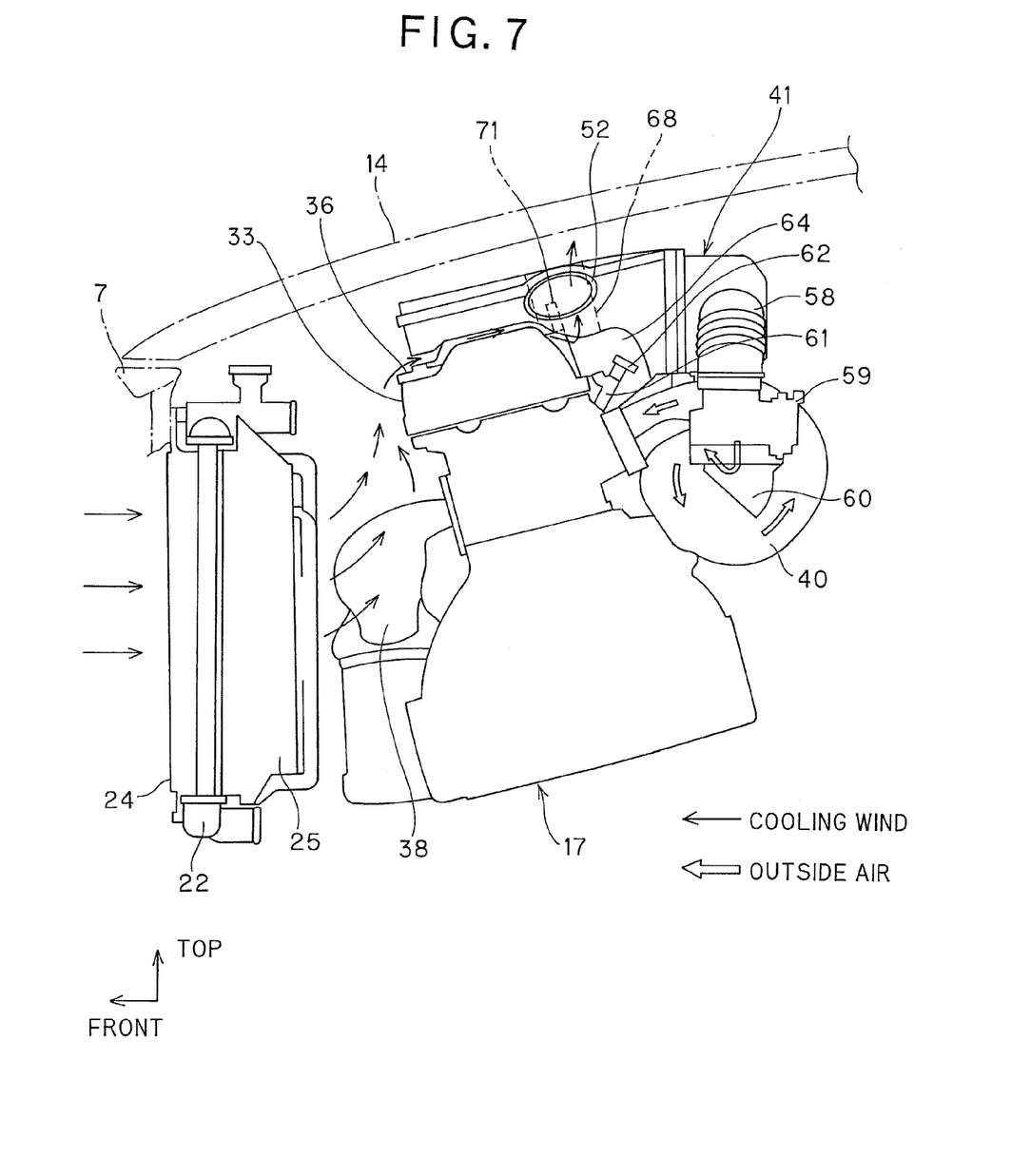
FIG. 7 is a left side view of the engine room with the indication of the flow of the outside air.

When viewing the intake box 41 from axis of the crankshaft, as shown in FIGS. 2, 5, and 7, the top surface of the intake box 41 is formed to have the same level to provide a certain clearance with respect to the engine hood 14, and the lower surface thereof is formed to have the resonator chamber 49, and a shallow bottom section 50 is formed at front section above the cylinder head cover 33 of the engine 17. The air cleaner chamber 47 is formed which is connected to the shallow bottom section 50 and contains the filter element 44. A deep bottom section 51 is formed at rear section above the intake manifold 40.

As shown in FIGS. 5-7, a fuel injection valve 61 for injecting the fuel to the cylinders of the engine 17 and a delivery pipe 62 for distributing the fuel to the fuel injection valve 61 are attached on a rear side of the cylinder head 32 of the engine 17 to which the intake manifold 40 is attached.

To the fuel delivery pipe 62, a fuel piping 63 is connected. The fuel injection valve 61 and the delivery pipe 62 are disposed in a space 64 which is rearward of the cylinder head 32 and which is surrounded by the intake manifold 40 attached to the rear side of the cylinder head 32 and the intake box 41. When viewing the intake box 41 from above the vehicle 1, the through-hole 68 are configured to connect to the space 64 in which the fuel injection valve 61 and the fuel delivery pipe 62 are disposed.

The fuel piping 63 is directed rearwardly passing the left side of the air outlet hose 58. Below the fuel piping 63 and sidewardly of the intake manifold 40, a heater inlet piping 66 and a heater outlet piping 66 are disposed.

Thus the fuel injection valve 61 and the fuel delivery pipe 62 are disposed in the space 64 between the intake manifold 40 and the intake box 41, and the through-hole 68 is communicated with the space 64. Accordingly, the hot air adjacent the fuel injection valve 61 and the delivery pipe 62 can be discharged upwardly from the through-hole 68, which prevents heat increase in the fuel flowing through the fuel injection valve 61 and the fuel delivery pipe 62 and therefore improves startability of the engine 17.

Further, when viewing the intake box 41 from above the vehicle 1, a support section 70 that is supported to the engine 17 through a floating rubber 69 is disposed in an inner circumference of the intake box 41. The support section 70 is disposed in an inner circumference of the through-hole 68.

More particularly, as shown in FIGS. 1 and 2, the support section 70 includes a first support section 70a at a center portion of the intake box 41, a second support section 70b below the air cleaner chamber 47 of the intake box 41 and on the left side of the vehicle, and a third support section 70c below the air cleaner chamber 47 of the intake box 41 and on the right side of the vehicle, The first support section 70a is disposed in the inner circumference of the through-hole 68.

Accordingly, by positioning the first support section 70a in the inner circumference of the through-hole 68, the hot air adjacent the floating rubber 69 can be discharged upwardly from the through-hole 68. This avoids thermal degradation of the floating rubber 69 as well as enhancement of the vibration of the intake box 41.

Still further, an oil level gauge 71 is disposed in the inner circumference of the through-hole 68 to check for the amount of oil in the engine 17, as shown in FIG. 6.

The oil level gauge 71 in the inner circumference of the through-hole 68 eliminates the need for a through-hole dedicated for the oil level gauge 71 in the intake box 41. Using of the space decreases the extent the intake passage 48 is bent, which improves the output performance of the engine 17, or expands the resonator chamber 49, which improves the noise reduction performance of the engine 17.

Also, a reference numeral 72 designates a plug cover.

Operation of this embodiment is described as follows.

In driving of the engine 17, the outside air is introduced to the engine 17.

As shown in open arrows in FIGS. 4 and 6, the outside air is introduced from the intake hole section 55 of the air inlet duct 54, then reaches the air inlet pipe 52 at an end of the intake box 41 through the intermediate hose section 56 and the downstream-side duct section 57.

Then the air introduced into the intake box 41 then travels behind the first resonator chamber 49a of the resonator chamber 49 through the intake passage 48 to a widthwise center section of the intake box 41, as shown in the open arrows in FIG. 6. The air turns rearwardly of the vehicle along the peripheral partition 67 of the air cleaner 47 that surrounds the through-hole 68, and then reaches the air cleaner chamber 47.

In the air cleaner chamber 47, the air passes through the filter element 44 of which filtering surfaces are oriented in upper and lower directions of the vehicle, and the air reaches the air outlet hose 58 on the downstream side of the intake box 41.

Thereafter, the air passed the outlet hose 58 is introduced through the throttle body 59 to the intake manifold 40 and further to the engine 17.

During running of the vehicle 1, the cooling air (in other words "driving wind") is introduced from the front side of the vehicle.

More particularly, as shown in solid arrows in FIGS. 6 and 7, the cooling wind for cooling the radiator 22 is introduced from the front side of the vehicle to the radiator 22 by the wind pressure during running of the vehicle 1 or by the electronic fan 25 for the radiator.

Then the cooling wind from the front of the vehicle travels through the air conditioner condenser 24, the radiator 22, and the electronic fan 25 so as to cool the radiator 22 as indicated by the solid arrows in FIGS. 6 and 7. After cooling the radiator 22, the cooling wind now becomes the hot air and reaches the front of the engine 17 in the engine room 15.

As indicated by the solid arrows in FIG. 7, the hot air reached engine 17 is merged into the hot air generated by the exhaust manifold 38 attached to the front side of the engine 17. The hot air then travels upwardly along the front of the engine 17 and reaches the intake box 41 positioned above the engine 17.

When the hot air from the radiator 22 and the exhaust manifold 38 is flown into the intake box 41, the resonator chamber 49 with the air space functions as the thermal insulating material so as to prevent the heating of the intake passage 48 and the air cleaner chamber 47 in the intake box 41. Also the through-hole 68 formed in the center portion of the intake box 41 prevents the heat transmission from the partition wall 46 of the resonator chamber 49 to the peripheral partition 67 of the air cleaner chamber 47, which prevents heat increase in the air taken into the engine 17 through the intake passage 48 and the air cleaner chamber 47.

As indicated by the solid arrows in FIG. 7, some of the hot air enters the clearance between the engine 17 and the intake box 41 and travels below the resonator chamber 49 and the intake passage 48, and is guided into the space 64 between the intake manifold 40 and the intake box 41 forward of the air cleaner chamber 47.

The lower surface of the air cleaner chamber 47 protrudes downwardly from lower surfaces of the resonator chamber 49 and the intake passage 48, which obstructs the traveling direction of the hot air.

In the space 64, since the through-hole 68 is formed to communicate with upside, the hot air is discharged upwardly of the intake box 41 from the through hole 68.

In addition, the front portions of the intake passage 48 and the air cleaner chamber 47 are covered by the resonator chamber 49, which decreases the area exposed to the hot air. Incidentally, the resonator chamber 49 is not a passage for the outside air, so that the outside air is not heated.

In addition, the fuel injection valve 61 and the delivery pipe 62 are disposed in the space 64 between the intake manifold 40 and the intake box 41, and the through-hole 68 is communicated to the space 64. Accordingly, when the cooling wind is guided to the space 64, the hot air adjacent the fuel injection valve 61 and the delivery pipe 62 is discharged upwardly, which prevents heat increase in the fuel passing the fuel injection valve 61 and the delivery pipe 62.

Further, since the first support section 70a is positioned in the inner circumference of the through-hole 68, the hot air adjacent the floating rubber 69 can be discharged upwardly from the thorough-hole 68. This avoids thermal degradation of the floating rubber 69 as well as enhancement of the vibration of the intake box 41.

Moreover, the oil level gauge 71 is disposed in the inner circumference of the through-hole 68, thereby eliminating the need for a through-hole dedicated for the oil level gauge 71 in the intake box 41. Using of the space decreases the extent the intake passage 48 is bent so as to improve the output performance of the engine 17, or provides an expanded resonator chamber 49 so as to improve the noise reduction performance of the engine 17.

Conventionally, there existed a system in which the intake box above the engine includes therein the air cleaner chamber, the intake passage for introducing the outside air to the air cleaner chamber, and the resonator chamber in communication with the intake passage. Although this improves assembly operation by integrating intake parts in the intake box, this suffers from the problem in which the outside air taken in through the intake passage and the air cleaner chamber to the engine is heated by the hot air generated by the radiator and the exhaust pipe, thereby deteriorating the output performance of the engine.

However, according to the embodiment of the present invention, the air cleaner chamber 47 is prevented from being heated by the hot air, since the air cleaner chamber 47 is disposed above the intake manifold 40 away from the radiator 22 and the exhaust manifold 38 which are the source of the heat.

The resonator chamber 49 with the air space is located forward of the air cleaner chamber 47 and the intake passage 48 to cover the overall width of the air cleaner chamber 47 and the intake passage 48. Accordingly, the intake passage 48 and the air cleaner 47 are prevented from being heated by the resonator chamber 49 functioning as the thermal insulating material.

Further, the through-hole 68 prevents the heat transmission from the partition wall 46 of the resonator chamber 49 to the peripheral partition 67 of the air cleaner chamber 47, which prevents heating of the intake passage 48 and the air cleaner chamber 47.

Accordingly, this prevents the heat increase in the outside air that is taken in through the intake passage 48 and the air cleaner chamber 47 to the engine 17, thereby improving the output performance of the engine 17.

In addition, when viewing the engine 17 from the crankshaft 16, for example viewing from the left side of the vehicle, the fuel injection valve for injecting the fuel to the respective cylinders of the engine 17 and the fuel delivery pipe 62 for distributing the fuel to the fuel injection valve 61 are located in the space 64 between the intake manifold 40 and the intake box 41. When viewing the intake box 41 form above the vehicle 1, since the through-hole 68 communicates with the space 64 in which the fuel injection valve 61 and the fuel delivery pipe 62 are positioned, the hot air can be discharged upwardly though the space 64 in which the fuel injection valve 61 and the delivery pipe 62 are positioned in case the hot air generated by the radiator 22 and the exhaust manifold 38 enters below the intake box 41. This prevents the heat increase in the fuel flowing the fuel injection valve 61 and the delivery pipe 62, which improves startability of the engine 17.

Further, when viewing the intake box 41 from above the vehicle 1, the support section 70 that is supported to the engine 17 through the floating rubber 69 is located inside of the intake box 41, and the supporting section 70, i.e. the first supporting section 70a, is disposed in the inner circumference of the through-hole 68. Thus the supporting section 70, i.e. the first supporting section 70a, is located in the inner circumference of the intake box 41. When the first supporting section 70*a* is supported to the engine 17 through the floating rubber 69, the floating rubber 69 may be degraded by being exposed to the hot air entering below the intake box 41. In contrast, according to the embodiment, locating of the first supporting section 70*a* in the inner circumference of the through-hole 68 where the air circulates avoids thermal degradation of the floating rubber 69 as well as enhancement of the vibration of the intake box 41.

Still further, locating of the oil level gauge 71 for checking the oil in the engine 17 in the inner circumference of the through-hole 68 eliminates the need for a through-hole dedicated for the oil level gauge 71 in the intake box 41. This enhances the flexibility of layout of the intake passage 48 and the resonator chamber 49. By the intake passage 48 of less curved shape, the output performance of the engine 17 can be enhanced. By the expanded resonator 49, the noise reduction performance of the engine 17 can also be enhanced.

What is claimed is:

1. An intake system of an engine, having
   the engine mounted on a vehicle having a crankshaft oriented in a widthwise direction of the vehicle,
   an exhaust manifold disposed forward of the engine in a longitudinal direction of the vehicle,
   an intake manifold disposed rearward of the engine,
   an intake box covering a cylinder head cover on top of the engine and the intake manifold, and
   the intake box having an inner space divided by a partition wall into an air cleaner chamber for containing a filter element, an intake passage for introducing the outside air to the air cleaner chamber, and a resonator chamber in communication with the intake passage, comprising the improvement wherein
   the air cleaner chamber is positioned above the intake manifold,
   the intake passage is formed to extend transversely of the vehicle and is bent rearwardly of the vehicle in the intake box to be connected to the air cleaner chamber,
   the resonator chamber is positioned forward of the air cleaner chamber and the intake passage, and is formed to cover the overall width of the air cleaner chamber and the intake passage,
   a through-hole is formed between the air cleaner chamber and the resonator chamber, which separates a peripheral partition wall of the air cleaner chamber from a peripheral partition wall of the resonator chamber, and
   when viewing the intake box from above the vehicle, the intake box includes a supporting section that is supported to the engine through a floating rubber in the inner circumference of the intake box, and the supporting section is disposed on the inner circumference of the through-hole.

2. The intake system of the engine according to claim 1, wherein when viewing the engine from the direction of the axis of the crankshaft, a fuel injection valve for injecting the fuel to respective cylinders of the engine and a delivery pipe for distributing the fuel to the fuel injection valve are disposed in a space between the intake manifold and the intake box, and
   wherein when viewing the intake box from above the vehicle, the through-hole is communicated with the space in which the fuel injection valve and the delivery pipe are disposed.

3. The intake system of the engine according to claim 1, wherein an oil level gauge for checking the amount of oil in the engine is disposed in the inner circumference of the through-hole.

* * * * *